(12) United States Patent
Rasmussen et al.

(10) Patent No.: US 12,018,639 B2
(45) Date of Patent: Jun. 25, 2024

(54) BULKHEAD FOR A WIND TURBINE BLADE AND METHOD FOR INSTALLING A BULKHEAD IN A WIND TURBINE BLADE

(71) Applicant: LM Wind Power A/S, Kolding (DK)

(72) Inventors: Kim Ansholm Rasmussen, Kolding (DK); Christian Brøndum Gjerlevsen, Kolding (DK); Brian Karsbæk, Kolding (DK); Sven Barlev, Kolding (DK)

(73) Assignee: LM WIND POWER A/S, Kolding (DK)

(*) Notice: Subject to any disclaimer, the term of this patent is extended or adjusted under 35 U.S.C. 154(b) by 183 days.

(21) Appl. No.: 17/615,765

(22) PCT Filed: Jun. 2, 2020

(86) PCT No.: PCT/EP2020/065232
§ 371 (c)(1),
(2) Date: Dec. 1, 2021

(87) PCT Pub. No.: WO2020/245124
PCT Pub. Date: Dec. 10, 2020

(65) Prior Publication Data
US 2022/0307463 A1    Sep. 29, 2022

(30) Foreign Application Priority Data
Jun. 3, 2019 (EP) .................................... 19177958

(51) Int. Cl.
*F03D 1/06* (2006.01)
(52) U.S. Cl.
CPC ...... *F03D 1/0658* (2013.01); *F05B 2230/604* (2013.01); *F05B 2260/301* (2013.01); *F05B 2280/6003* (2013.01)

(58) Field of Classification Search
CPC ................ F03D 1/0658; F05B 2230/60; F05B 2260/301; F05B 2280/6003; B29L 2031/085
See application file for complete search history.

(56) References Cited

U.S. PATENT DOCUMENTS 9,651,023 B2    5/2017  Berg
9,951,815 B2 *  4/2018  Minadeo .............. F16C 35/042
(Continued)

FOREIGN PATENT DOCUMENTS

EP    2235364 A1    10/2010
EP    3315768 A1     5/2018
(Continued)

OTHER PUBLICATIONS

Priority Search Report dated Dec. 13, 2019 for application No. EP19177958.6.
(Continued)

*Primary Examiner* — Sang K Kim
(74) *Attorney, Agent, or Firm* — Nath, Goldberg & Meyer; Jerald L. Meyer; Tanya E. Harkins (57) ABSTRACT

The present invention relates to a method for installing a bulkhead in a wind turbine blade. The bulkhead comprises attachment means for attaching the bulkhead to the root end of the blade; a movement device moves the bulkhead into the installation position; the moving comprising engaging the attachment means of the bulkhead with receiving means of the root end, the receiving means being arranged and adapted to receive and hold the bulkhead by engaging with the attachment means of the bulkhead; and adhering the bulkhead to the wind turbine blade. A bulkhead for use in the method is also provided.

15 Claims, 10 Drawing Sheets

(56) References Cited

U.S. PATENT DOCUMENTS

| | | | | |
|---|---|---|---|---|
| 2014/0377069 A1* | 12/2014 | Minadeo | ................ | F03D 80/70 |
| | | | | 416/135 |
| 2014/0377072 A1* | 12/2014 | Moore | ................ | F03D 1/0633 |
| | | | | 416/204 A |
| 2016/0356263 A1 | 12/2016 | Schafer et al. | | |
| 2018/0156203 A1* | 6/2018 | Christensen | ............ | F03D 80/70 |
| 2019/0017493 A1 | 1/2019 | Saini et al. | | |
| 2020/0355160 A1* | 11/2020 | Rogers | ................ | F03D 1/0675 |
| 2020/0355165 A1* | 11/2020 | Rieken | ................ | F16C 33/586 |
| 2020/0378358 A1* | 12/2020 | Devaraj | ................ | F03D 1/0658 |

FOREIGN PATENT DOCUMENTS

| | | | |
|---|---|---|---|
| WO | 2011144971 A1 | 11/2011 | |
| WO | 2019038274 A1 | 2/2019 | |

OTHER PUBLICATIONS

International Search Report dated Aug. 31, 2020 for application No. PCT/EP2020/065232.

\* cited by examiner

BULKHEAD FOR A WIND TURBINE BLADE AND METHOD FOR INSTALLING A BULKHEAD IN A WIND TURBINE BLADE

This is a National Phase Application filed under 35 U.S.C. 371 as a national stage of PCT/EP2020/065232, filed Jun. 2, 2020, an application claiming the benefit of European Patent Application No. 19177958.6, filed Jun. 3, 2019, the content of each of which is hereby incorporated by reference in its entirety.

TECHNICAL FIELD

The present invention relates to a bulkhead for a wind turbine blade and a method for installing a bulkhead in a wind turbine blade.

BACKGROUND

Wind turbine blades are regularly provided with bulkheads at the root end of the blades. Such bulkheads may be used to substantially seal the root end of the blade and in some cases to provide a work platform at the blade root end.

Present methods of installing bulkheads are typically cumbersome, requiring undesirable manipulations and operations on the bulkhead in order to install it. For instance, some present methods of installing bulkheads in the root end of a wind turbine blade require temporarily installing attachment means such as a steel plate on the bulkhead. The bulkhead is then placed at the installation point and the attachment means is attached to the root end in some temporary manner. The bulkhead is then adhered to the wind turbine blade shell. Afterwards, the attachment means is removed. Such separate attachment means is more cumbersome to handle, and more time is required in order to place the separate attachment means correctly on the bulkhead.

It is an object of the invention to provide a bulkhead for a wind turbine blade which allows for a less time-consuming installation. The invention also provides a method for installing a bulkhead in the root end of a wind turbine blade.

SUMMARY OF THE INVENTION

In a first aspect, the invention provides a method for installing a bulkhead at an installation position in a wind turbine blade having a root end comprising fastening means for fastening the wind turbine blade to a wind turbine hub. The method comprises:
  providing the bulkhead to be installed in the wind turbine blade, the bulkhead comprising attachment means for attaching the bulkhead to the root end,
  attaching holding means of a movement device to the bulkhead, the attaching of the holding means allowing the movement device to hold and lift the bulkhead,
  moving, using the movement device, the bulkhead into the installation position while the bulkhead is attached to the holding means, the moving comprising engaging the attachment means of the bulkhead with receiving means of the root end, the receiving means being arranged and adapted to receive and hold the bulkhead by engaging with the attachment means of the bulkhead,
  adhering the bulkhead to the wind turbine blade.

Embodiments of this method may reduce the time it takes to install a bulkhead in a wind turbine blade. They may also improve safety during installation of a bulkhead in a wind turbine blade. Furthermore, they may improve the precision with which the bulkhead is installed in a wind turbine blade.

In some embodiments, the attachment means has been formed integrally in the bulkhead. Such embodiments are advantageous because they most easily eliminate the need to install temporary separate attachment means, such as a steel plate, on the bulkhead. Such separate means are more cumbersome to handle, and more time is required in order to place the separate attachment means correctly on the bulkhead. The separate attachment means are not connected to the root end as such by engaging with receiving means at the root end.

In some embodiments, the bulkhead is made of one or more fibre-reinforced composites, such as a glass fibre composite and/or a carbon fibre composite.

The step of adhering may for instance comprise adhering an outer surface of a peripheral wall of the bulkhead to an inner surface of a peripheral wall of the wind turbine blade, for instance by gluing. In some embodiments, the adhering provides an airtight and/or watertight seal, preventing communication of objects and/or moisture across the bulkhead.

In some embodiments, after the step of adhering, a part of or all of the attachment means is removed from the bulkhead. This may involve a removal, such as a destructive removal, such as destructive severing, of part or parts of the bulkhead.

In some embodiments, before the step of adhering, the holding means are released from the bulkhead. The movement device can furthermore be moved in such a way that at least the holding means does not interfere with the step of adhering.

In some embodiments, before moving the bulkhead into the installation position and while the bulkhead is attached to the holding means, it is determined that the attachment means of the bulkhead is not aligned with the receiving means of the root end, and a step of aligning the attachment means with the receiving means by rotating the bulkhead using the movement device is performed in response.

In some embodiments, the attachment means comprises one or more holes and the receiving means comprises corresponding one or more pins. Alternatively, or in addition, the attachment means comprises one or more pins and the receiving means comprises corresponding one or more holes. In both cases, the step of moving the bulkhead into the installation position comprises engaging the one or more pins with the one or more holes.

The one or more holes and/or one or more pins may be located for instance in a flange or in one or more flange tabs extending radially outwards from a peripheral wall of the bulkhead. The peripheral wall extends from a base portion and is used at least for adhering the bulkhead to an inner peripheral wall of a wind turbine blade. Embodiments of the present invention are particularly useful for generally U-shaped bulkheads but may be compatible with wind turbine blade bulkheads having other shapes. Such bulkheads must be able to accommodate attachment means that engage with receiving means in the root end, as described above. Some types of bulkheads are referred to as root closeouts.

The flange tabs can have any shape, such as square, rectangular, or a rounded shape. A flange tab is generally any outward extension of the peripheral wall. Preferably, the tab or tabs are located proximal to an end of the bulkhead opposite the base portion. In case it is desired that the bulkhead is not completely inserted into the wind turbine blade once installed, the tab or tabs could be arranged between base portion and the end of the bulkhead opposite the base portion.

Since a wind turbine root end, often circular, usually lies in a plane, tabs, if more than one, may accordingly be arranged in a common plane. When the tabs and the receiving means of the root end are engaged, the tabs will be flush with the root end. However, although this may be advantageous, having the tabs arranged in a common plane is optional.

In some embodiments, the fastening means of the root end comprises bushings, and the attachment means of the bulkhead comprises one or more pins adapted to temporarily engage with corresponding one or more of the bushings. The step of arranging the receiving means in the root end comprises engaging the one or more pins with corresponding one or more of the bushings.

Some embodiments comprise a step of clamping the bulkhead to the root end when the attachment means of the bulkhead is engaged with the receiving means of the root end.

In some embodiments, before the step of adhering, the holding means is released from the bulkhead. In some embodiments, after the step of clamping and before the step of adhering, the holding means is released from the bulkhead.

In some embodiments, the holding means is vacuum attachment means, and the step of attaching the holding means to the bulkhead comprises bringing the vacuum attachment means into contact with the bulkhead and activating a suction in the vacuum attachment means to releasably attach the bulkhead to the vacuum attachment means. Releasing the vacuum attachment means may include ceasing the suction.

In other embodiments, the holding means comprise grabber means and/or tension means, such as tension rod type means.

A second aspect of the invention provides a bulkhead for a wind turbine blade. The bulkhead comprises:
  a base portion for partitioning an inner cavity of a wind turbine blade,
  a peripheral wall extending from the base portion for adhering the bulkhead to an inner peripheral wall of a wind turbine blade,
  a flange or one or more flange tabs, the flange or one or more flange tabs extending radially outwards from the peripheral wall, the flange or one or more flange tabs comprising:
a) one or more holes for engaging with corresponding one or one pins in a root end of a wind turbine blade, and/or
b) one or more pins for engaging with corresponding one or more holes in a root end of a wind turbine blade.

Such bulkheads are particularly suitable for use in embodiments of the first aspect of the invention. It can simplify the process of installing the bulkhead in a root end of a wind turbine blade. It may also improve safety during the bulkhead installation. Furthermore, it may improve the precision with which the bulkhead is installed in a wind turbine blade.

In some embodiments, the base portion, the peripheral wall and the flange or one or more flange tabs are formed integrally in the bulkhead.

The flange or one or more flange tabs (attachment means) may for instance comprise one or at least two holes for engaging with corresponding one or at least two pins of a root end of a wind turbine blade. Alternatively, or additionally, the flange or one or more flange tabs (attachment means) may comprise at least two pins for engaging with corresponding at least two holes in a root end of a wind turbine blade. In some embodiments, the flange or one or more flange tabs (attachment means) comprises at least one hole and at least one pin for engaging with corresponding at least one pin in a root end of a wind turbine blade and at least one hole in the root end of the wind turbine blade, respectively.

In some embodiments, the base portion, the peripheral wall and the flange or one or more flange tabs are formed integrally.

In some embodiments, the bulkhead is made partly or entirely of one or more fibre-reinforced composites, such as a glass fibre composite and/or a carbon fibre composite.

BRIEF DESCRIPTION OF THE DRAWINGS

The invention is explained in detail below by way of example with reference to the drawings.

DETAILED DESCRIPTION OF THE INVENTION

Figure 1:
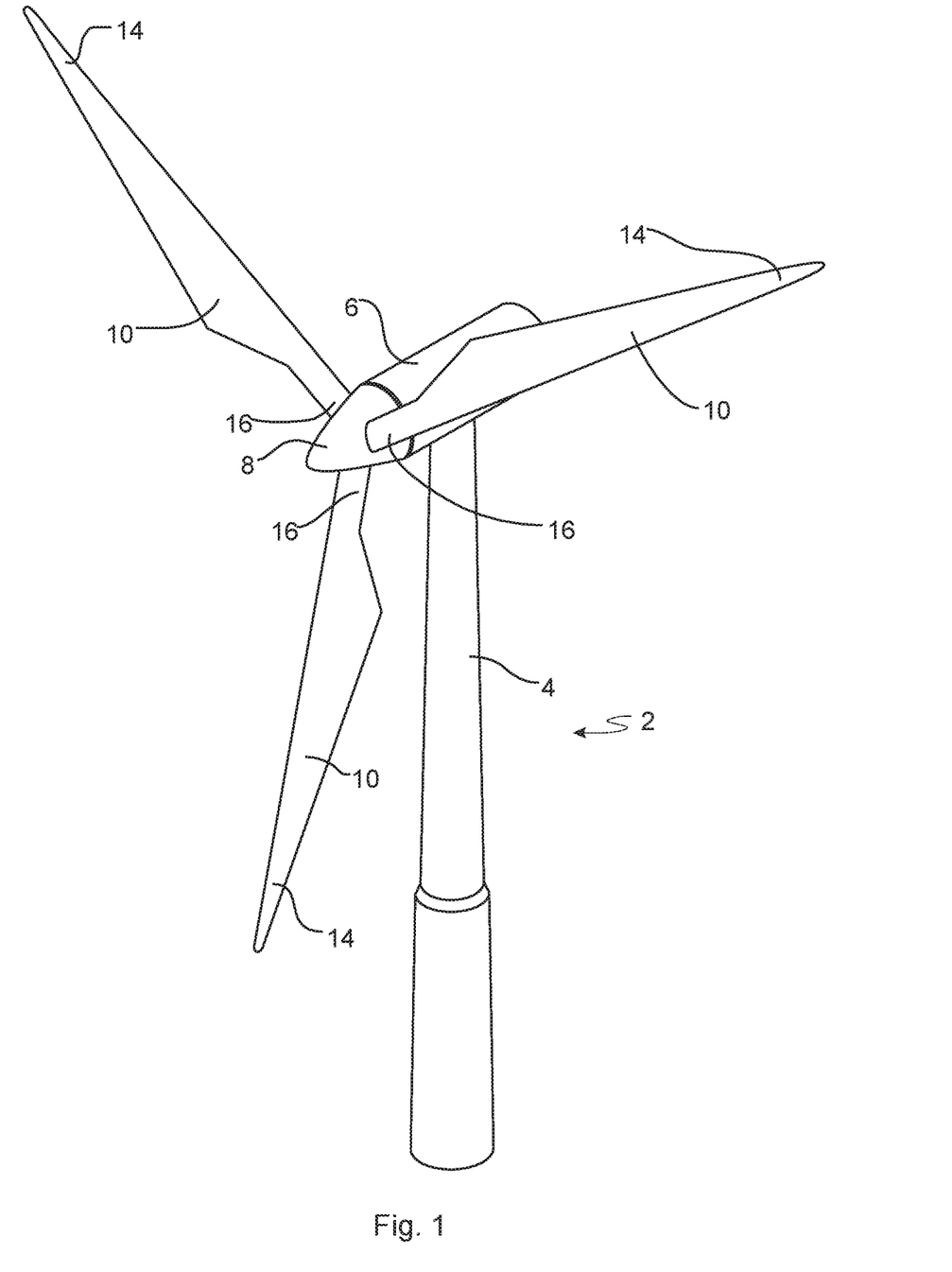
FIG. 1 shows a schematic view of a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a root end 16 nearest the hub and a blade tip 14 furthest from the hub 8.

Figure 2:
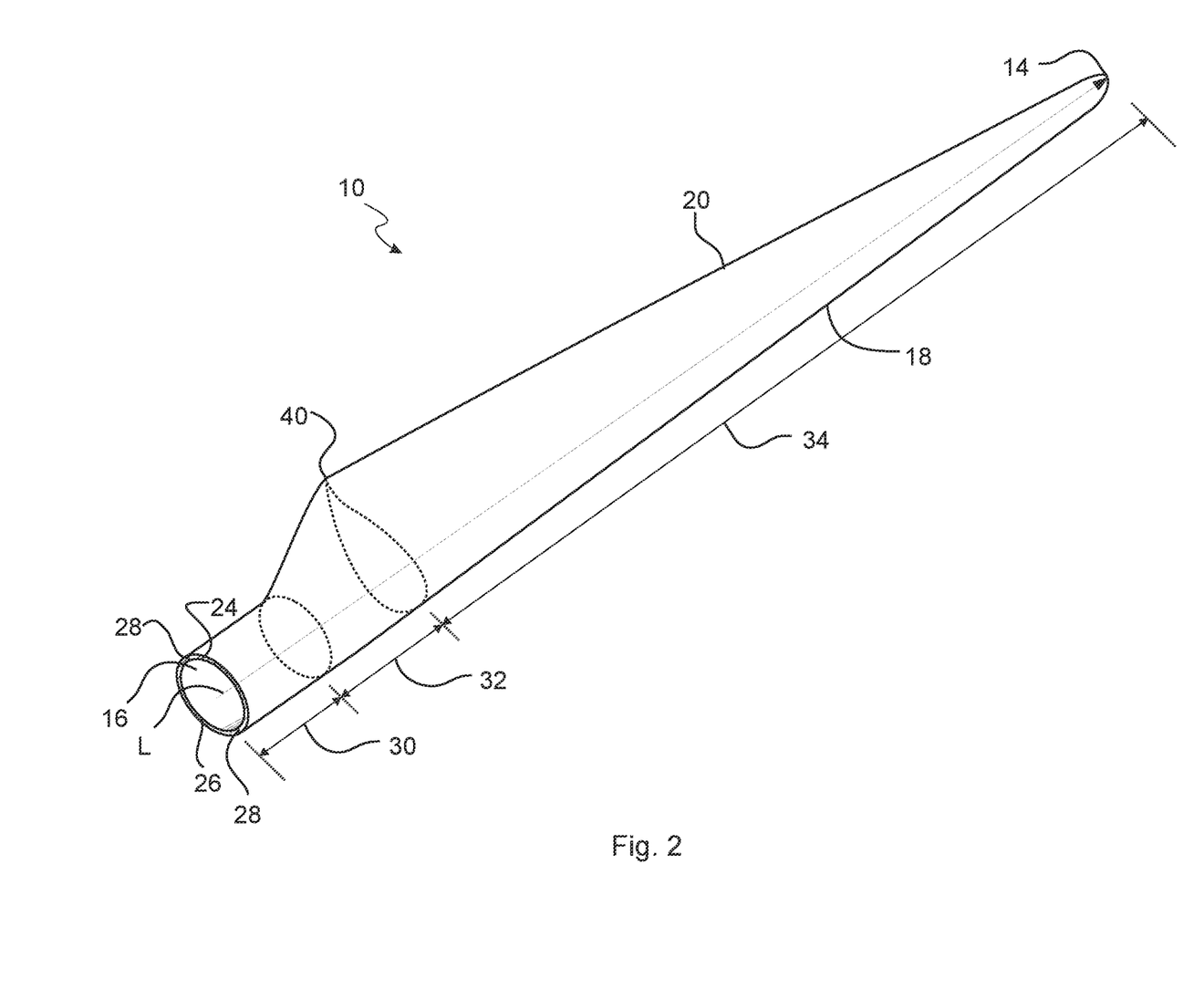
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or airfoil region 34 furthest away from the hub 8, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The airfoil region 34, also called the profiled region, has an ideal or almost ideal blade shape with respect to generating lift, whereas the root region 30 due to structural considerations has a substantially circular or elliptical cross-section, which for instance makes it easier and safer to mount the blade to the hub 8. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region 34 typically decreases with increasing distance r from the hub. A shoulder 40 of the blade 10 is defined as the position, where the blade has its largest chord length. The shoulder 40 is typically provided at the boundary between the transition region 32 and the airfoil region 34.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are attached to one another with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
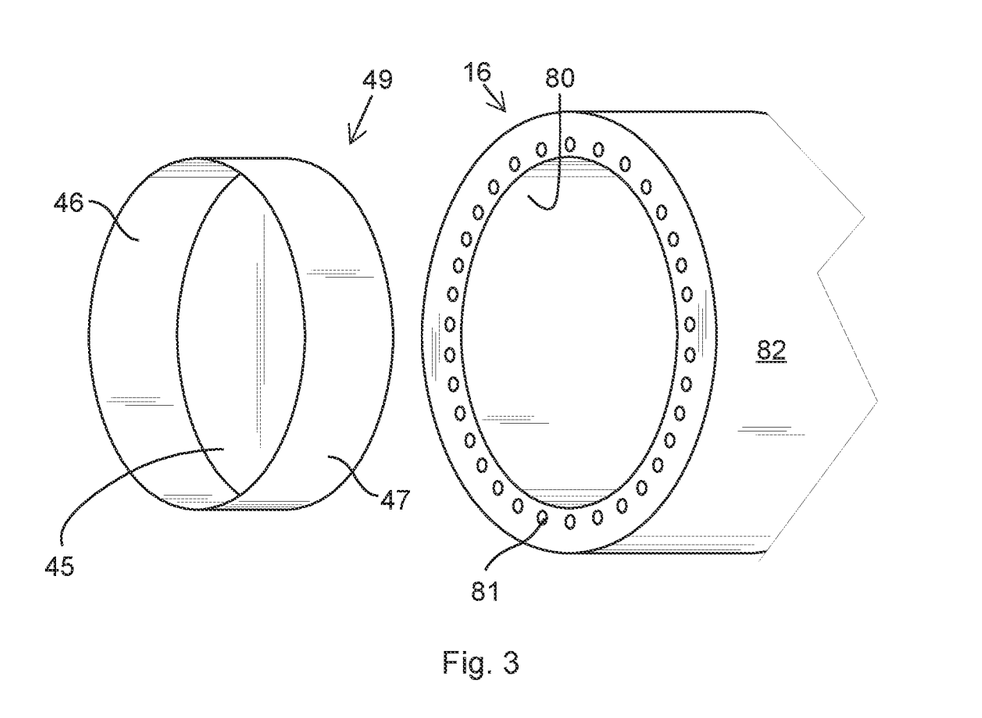
FIG. 3 shows a schematic view of prior art installation of a prior art bulkhead, shown schematically, in a root end of a wind turbine blade.

FIG. 3 illustrates schematically a prior art bulkhead 49 having a peripheral wall 46 having a peripheral wall outer surface 47 which will be adhered to a root end peripheral wall inner surface 80 of a root end 16 of a wind turbine blade such as the wind turbine blade shown in FIGS. 1 and 2. The wind turbine blade 10 has a root end peripheral wall outer surface 82 opposite the root end peripheral wall inner surface 80. The outer surface 82 will be in contact with the environment, including winds, precipitation and the like.

The bulkhead 49 has a base portion 45 which serves to partition the inner cavity of the wind turbine blade 10, for instance to seal an inner cavity in at least a part of the root region 30 (see FIG. 1) from the cavity further out towards the blade tip 14 (see FIG. 1). In some cases, the bulkhead contains doors allowing personnel to move further into the wind turbine blade 10, beyond the bulkhead 49.

Figure 4:
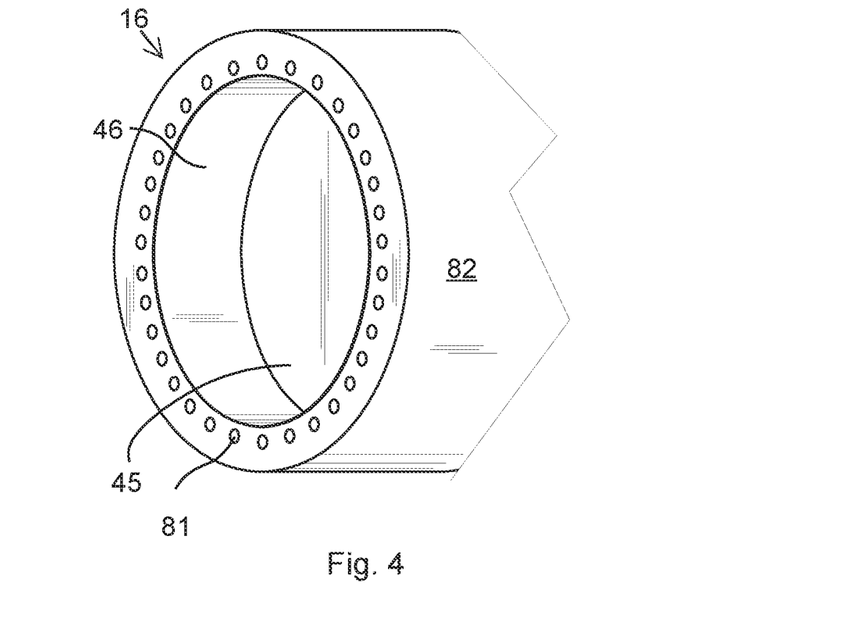
FIG. 4 shows a schematic view of a wind turbine blade with a bulkhead, shown schematically, installed.

In the present example, the wind turbine blade root end 16 has bushings 81 at the root end. These are fastening means for fastening the wind turbine blade to a wind turbine hub such as hub 8 in FIG. 1. FIG. 3 also illustrates a peripheral wall inner surface 80 at the root end. The bulkhead 49 is moved into an installation position and adhered to the root end peripheral wall inner surface 80. This is typically done by adhering the peripheral wall outer surface 47 of the bulkhead 49 to the root end peripheral wall inner surface 80 at the root end 16 using a glue. To lift the bulkhead 49 into the installation position, attachment means such as a steel plate is attached to the bulkhead, and the bulkhead is then lifted to the installation position using lifting equipment (not shown). All in all, this is cumbersome. Nevertheless, in the end, the bulkhead gets installed, as illustrated in FIG. 4.

Embodiments of the present invention simplify the bulkhead installation process.

Figure 5:
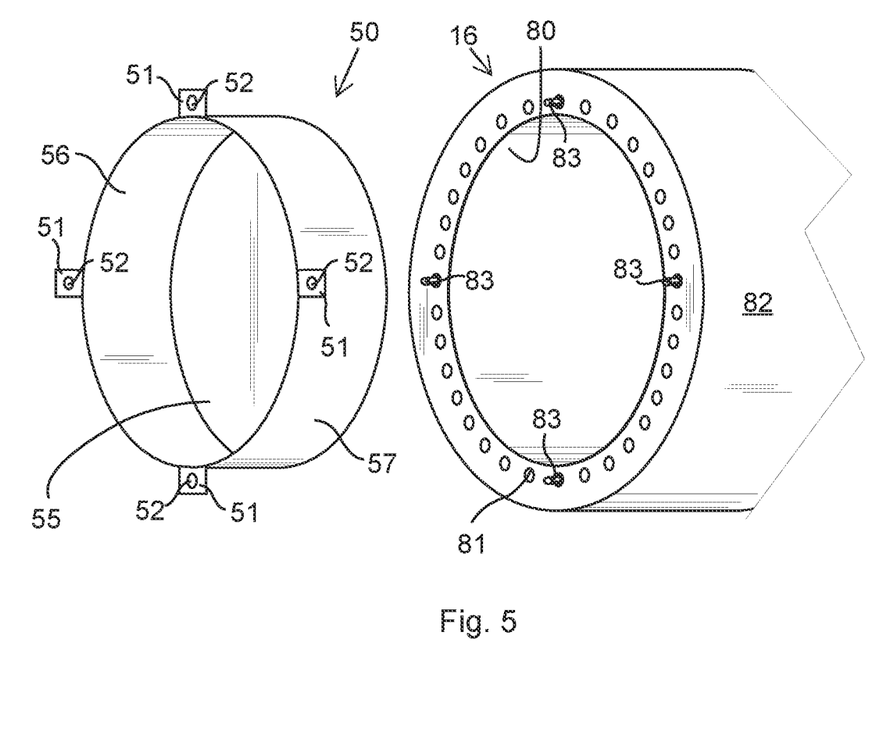
FIG. 5 shows a schematic view of a bulkhead in accordance with an embodiment of the invention, and part of an installation in accordance with an embodiment of the invention.

FIG. 5 illustrates a bulkhead 50 in accordance with an embodiment of the invention. The bulkhead 50 has a peripheral wall 56, the outer surface 57 of which will be adhered to a root end peripheral wall inner surface 80 of a root end 16 of a wind turbine blade such as the wind turbine blade 10 shown in FIGS. 1 and 2. The wind turbine blade may be structurally identical to the one discussed in relation to FIGS. 3 and 4. The wind turbine blade 10 has an outer surface 82 opposite the root end peripheral wall inner surface 80. The outer surface 82 will be in contact with the environment, including winds, precipitation and the like.

The bulkhead 50 has a base portion 55 which serves to partition the inner cavity of the wind turbine blade 10 for instance to seal an inner cavity in at least a part of the root region 30 (see FIG. 1) from the cavity further out towards the blade tip 14 (see FIG. 1). In some cases, the bulkhead contains one or more doors allowing personnel to move further into the wind turbine blade 10 beyond the bulkhead 50.

The bulkhead 50 in the present example comprises four flange tabs 51 extending radially outwards from the peripheral wall 56 of the bulkhead 50, each flange tab having a corresponding hole 52. The flange tabs are arranged and adapted to engage with corresponding pins 83 in the root end 16 of the wind turbine blade in order to hold the bulkhead 50 in place at its installation position. The number of flange tabs 51 with holes 52 can in principle be any number equal to one or higher, for instance 1, 2, 3, 4 or more than 4. Having only one flange tab 51 with a hole 52 does not result in a very easy-to-use installation process. Three or four tabs 51 with holes 52 result in a particularly efficient method.

As part of the installation process, the bulkhead is moved to the installation position and adhered to the root end peripheral wall inner surface 80 at the root end 16.

The flange tabs 51 with holes 52 are adapted to engage with corresponding holding means 83 at the root end, in this case pins 83 that extend from bushings 81 in the root end, although other means of engaging with the flange tabs could be used. The bushings 81 may for instance be those used for fastening the wind turbine blade to a wind turbine hub such as hub 8 in FIG. 1.

In some embodiments, the pins are adapted to engage with an inner threading of the bushings and have a portion that extends away from the root end, generally along a longitudinal axis of the wind turbine blade. The installation process will be described in more detail below.

Figure 6:
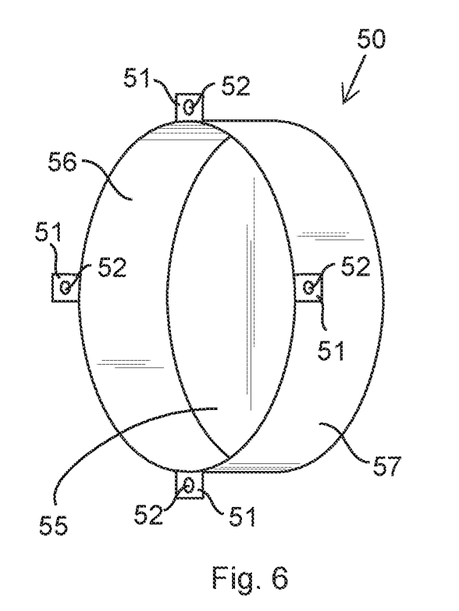
FIGS. 6-7 show schematic views of bulkheads in accordance with embodiments of the invention.

FIG. 6 illustrates the bulkhead 50 also illustrated in FIG. 5, and reference is therefore made to the description above.

Figure 7:
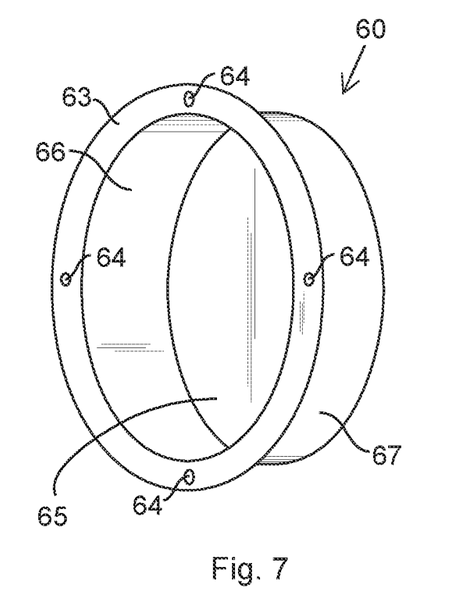

FIG. 7 illustrates another embodiment of a bulkhead 60. The bulkhead 60 comprises a base portion 65 and a peripheral wall 66. Each of the base portion 65 and the peripheral wall 66 may be identical to or different from the corresponding elements of the bulkhead 50 illustrated in FIG. 6. Additionally, the bulkhead 60 comprises a flange 63 extending along the entire periphery of the peripheral wall 66 and in a radially outward direction. The flange in FIG. 7 has four holes 64 in the flange 63. Like the holes 52 in FIGS. 5 and 6, the holes 64 are arranged and adapted to engage with corresponding pins in the root end 16 of the wind turbine blade in order to hold the bulkhead 60 in place at its installation position. The number of holes 64 can in principle be any number equal to one or higher, for instance 1, 2, 3, 4 or more than 4. Having only a single hole 64 does not result in a very easy-to-use installation process. Three or four holes 64 result in a very efficient method. In the example shown in FIG. 7, a part of the flange must be removed before the gluing process can be performed since the flange 63 covers the space between the root end peripheral wall inner surface 80 and the outer surface 67 of the bulkhead 60. Material can be removed for instance in a manner that results in the bulkhead 50 shown in FIG. 6. In most cases, having to remove part or parts of a full flange is not desirable, let alone not easy, and thus if the attachment means is formed as one or more flange tabs in the first place, the process is substantially simpler.

In some cases, it is advantageous to form the flange tabs 51 or flange 63 as part of the process of manufacturing the bulkhead itself. This can replace a process of attaching separate flange tabs (or flange) after manufacturing of the actual bulkhead. Such integrally formed flange tabs (or flange) may also lead to a more precise and reproducible installation.

The bulkhead may, as an example, be made of fibre-reinforced composites, such as a glass fibre reinforced composite or carbon fibre reinforced composite or other fiber reinforced composite, or a combination thereof. Flange tab or tabs are relatively easy to form as part of the process. The holes 52, 64 can be provided very precisely afterwards using a jig that, when arranged of the flange tabs 51 or flange 63, marks precisely where the hole or holes are to be formed to be adapted precisely to the receiving means of the root end 16, such as the root end pins 83 in FIG. 5. The process may be further automated, for instance by using computer-controlled automated drill. The exact forming of the attachment means of the bulkhead and the receiving means of the root end is merely a matter of design.

FIGS. 8a-8h illustrate example steps for installing the bulkhead embodiment 50 into a root end 16 of a wind turbine blade.

Figure 8A:
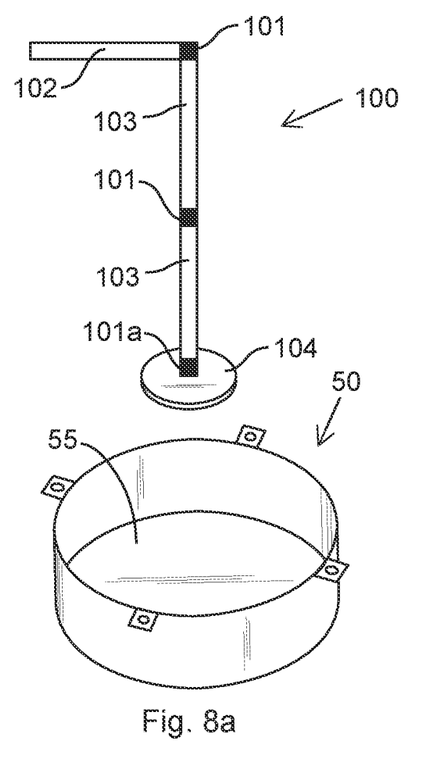
FIGS. 8a-8h show a schematic view of steps in accordance with an embodiment of the invention for installing a bulkhead in a wind turbine blade.

As illustrated in FIG. 8a, the bulkhead is situated at some position from which position it must be moved to the installation position in the root end of the wind turbine blade. In this example, a mechanical movement device 100 is used to move the bulkhead. The movement device can be more or less automated, not autonomous or partly or entirely autonomous. In this particular example, the movement device comprises joints 101, 101a and arms 102, 103 interconnected by the joints 101. The number of arms and joints is not essential.

In the present example, the movement device has a vacuum cup 104 at an end. It is connected to a joint 101a, which in this example is rotatable, allowing the vacuum cup 104 to be rotated.

Figure 8B:
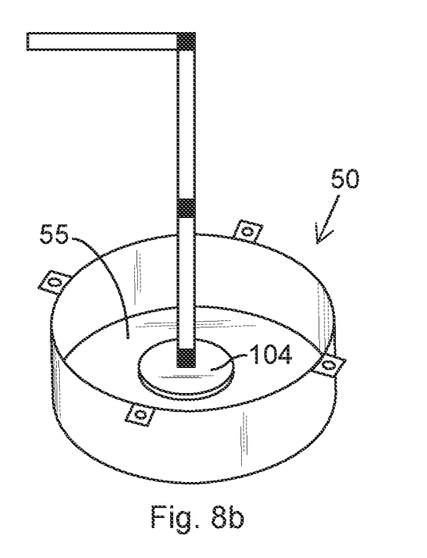
Figure 8C:
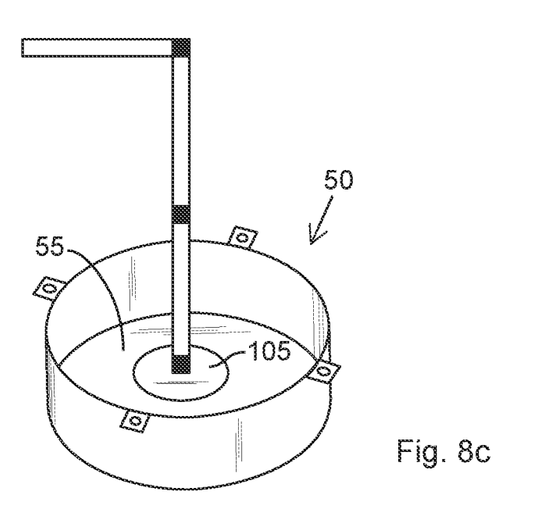

FIG. 8b illustrates the movement device 100 being moved in such a way that the vacuum cup 104 is brought into contact with the base portion 55 of the bulkhead 50. FIG. 8c illustrates suction being applied in the vacuum cup 104, illustrated by the flattened vacuum cup 105. This causes the bulkhead 50 to be temporarily, firmly attached to the movement device 100, in particular via the vacuum cup 105. The bulkhead 50 can therefore now be lifted and otherwise moved.

Movement may rely for instance entirely on the joints, where the movement device 100 is attached for instance to a floor or wall or a blade shell mould or other stationary object. Alternatively, the movement device 100 illustrated may be attached to a tractor, truck, or other vehicle which can account for movement, such as translation, of the bulkhead 50 from one position to another. In view of the present disclosure, the person skilled in the art will readily recognize that other suitable movement device implementations or ways of moving the bulkhead 50 can be used that are equivalent with those described herein.

Figure 8D:
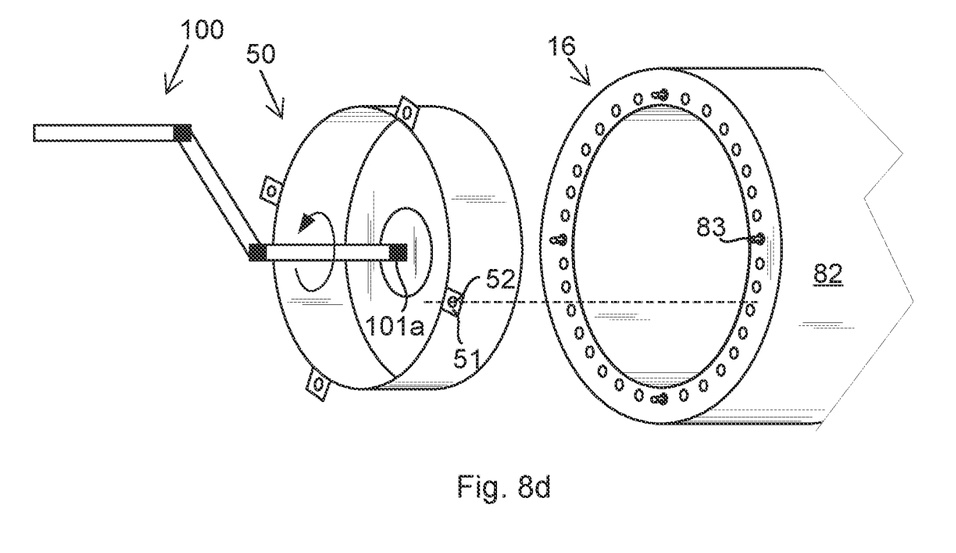
Figure 8E:
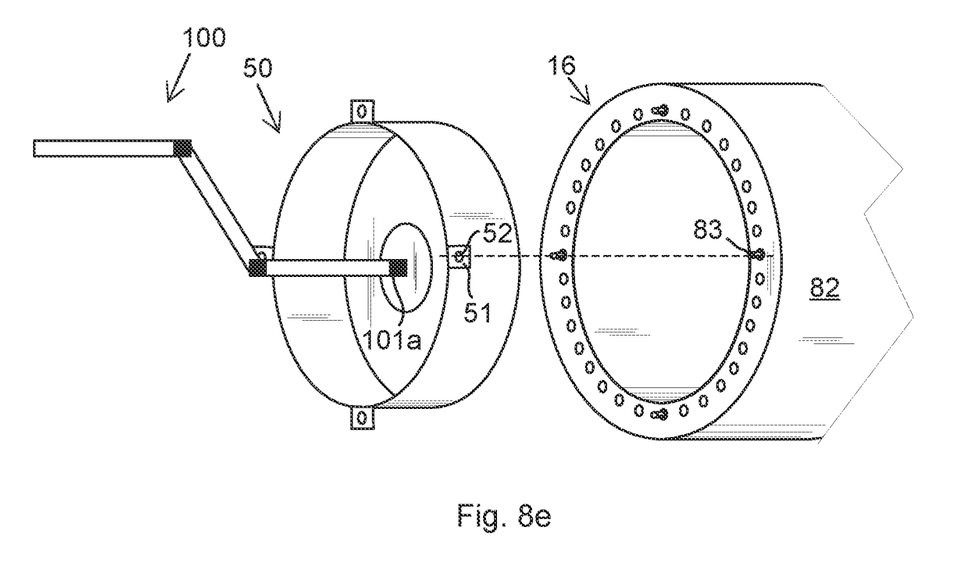

FIG. 8d illustrates that the movement device 100 has been reconfigured in such a way that the bulkhead 50 is close to the root end 16 of the wind turbine blade where the flange tabs 51 with holes 52 are to engage with the pins 83. As illustrated by the dashed line, the flange tab holes 52 may not necessarily line up with the pins 83. The present example includes the optional possibility of rotating the vacuum cup 105, for instance using a rotatable joint 101a. The rotation arrow in FIG. 8d indicates that the vacuum cup is rotated in order to eliminate the misalignment between the holes 52 and pins 83. This results in the lined-up configuration in FIG. 8e, where, as illustrated by the dashed line in FIG. 8e, the holes 52 and pins 83 are now aligned and readily engageable by a simple translation of the bulkhead 50 towards the root end 16.

Figure 8F:
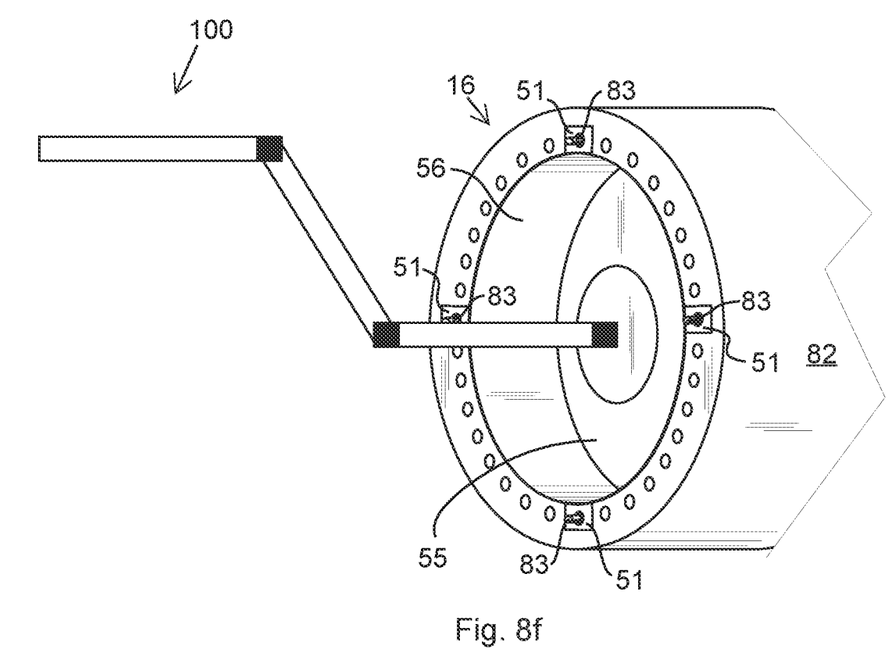

FIG. 8f illustrates the bulkhead having been translated such that the holes 52 of the flange tabs 51 have engaged with the pins 83 of the root end 16, whereby the bulkhead is in the installation position. Here, it can be adhered to the peripheral wall inner surface at the root end 16.

Figure 8G:
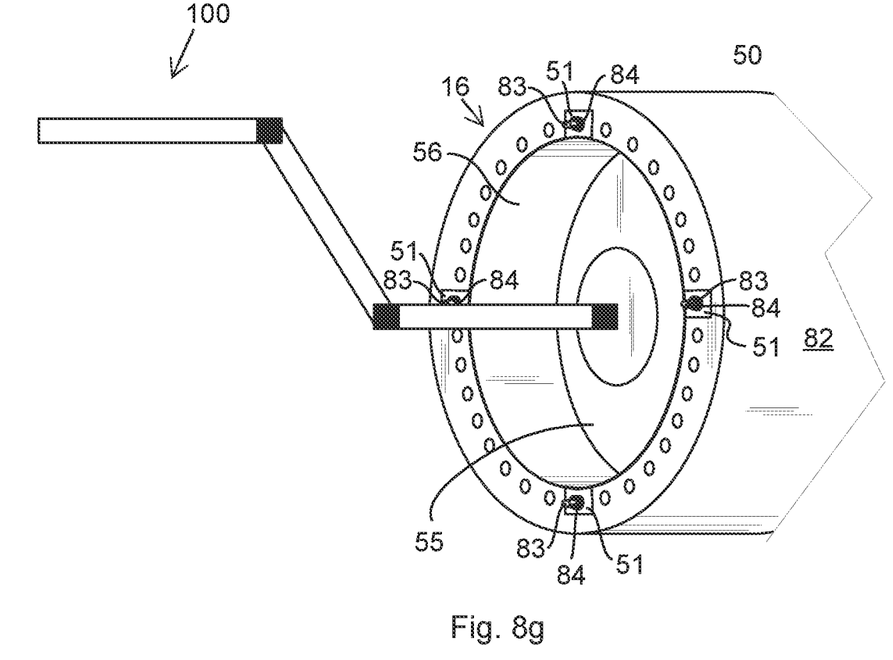
Figure 8H:
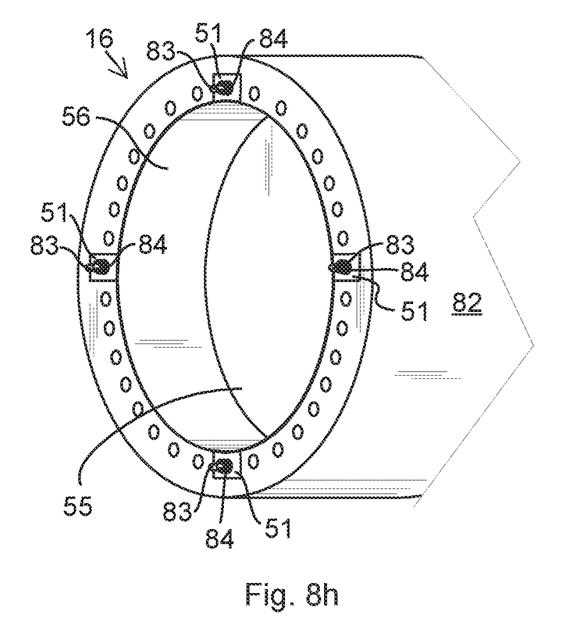
Figure 9:
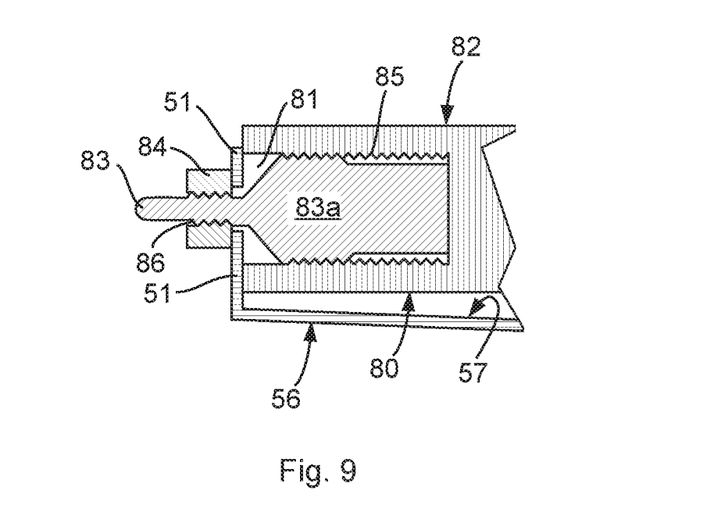
FIG. 9 shows schematically a root end bushing containing a temporarily engaged pin and a bulkhead clamped on the root end using a nut engaged with the pin.

FIG. 8g illustrates an optional step that can be quite advantageous. Instead of securing the bulkhead by holding the bulkhead using the movement device 100, the bulkhead 50 is clamped on the root end 16 by other means. In this example, nuts 84 are used on pins 83 having a corresponding threading. This secures the bulkhead 50 to the root end 16. Proper clamping can also ensure that bulkheads are placed very precisely. Once clamped, the movement device 100 is advantageously moved out of the way to make reduce clutter near the root end, making it easier and safer to work at the root end. FIG. 8h illustrates the bulkhead 50 being held in place merely by the attachment means 51 engaged with the receiving means 83, clamped using nuts 84 engaging with the pins 83. FIG. 9 illustrates such a clamping mechanism in more detail. It shows a radial cross-section of part of the root end 16. The outer surface 82 and the inner surface 80 of the root end 16 is shown, along with a bushing 81 that has an inner threading 85 for retaining a fastening bolt for mounting the wind turbine blade to a hub where the root end 16 interfaces the hub. In this example, specialized reusable pins have a section 83a which engages with a part of the bushing threading 85 to allow the pin 83 to be arranged very precisely. The flange tab 51 of the bulkhead is clamped against the root end using a nut 84 that engages with an outer threading 86 on the pin 83 outside the bushing. The peripheral wall outer surface 57 of the bulkhead is facing the peripheral wall inner surface 80 of the wind turbine blade. These interfaces will be joined in the adhering step, for instance by gluing.

After the bulkhead 50 has been adhered to the wind turbine blade, the flanges are advantageously severed from the rest of the bulkhead in order to not interfere with the bushings and in particular to allow gluing the bulkhead to the root end in the parts that were inaccessible due to the flange tabs 51. The nuts, if used, are removed before, during or after removing (such as by severing) the flange tabs 51 from the rest of the bulkhead 50. The pins 83 are then removed. In the example provided in FIG. 9, the pins are removed by unscrewing them (not shown) from the bushings 81. These pins may be reusable, and thus the example in FIG. 9 provides a very convenient way of attaching the bulkhead firmly to the root end.

Figure 10:
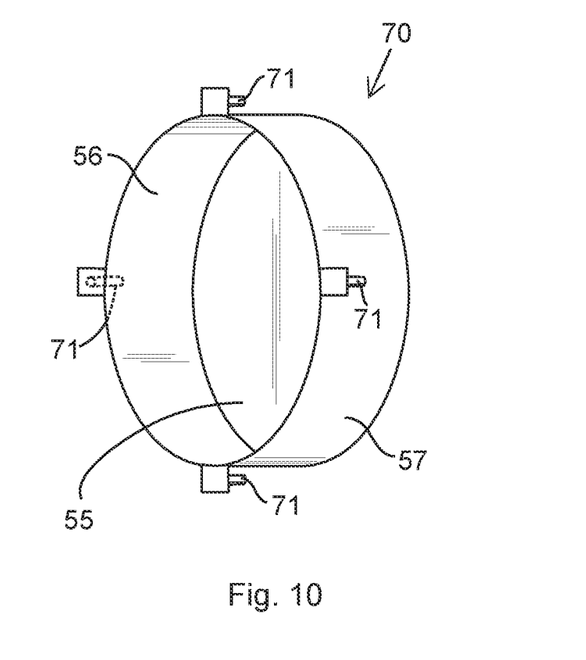
FIG. 10 shows a schematic view of a bulkhead in accordance with an embodiment of the invention.
Figure 11:
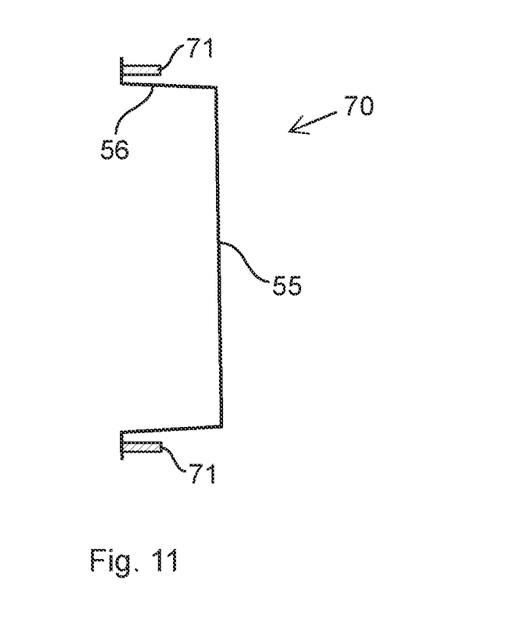
FIG. 11 shows a schematic cross-section of the bulkhead embodiment shown in FIG. 10.

FIGS. 10 and 11 illustrate a bulkhead 70 which uses pins 71 as attachment means rather than flange tabs 51 with holes 52 as illustrated for instance in FIG. 6 and FIGS. 8a-8h. The bulkhead pins 71 in the embodiment of the bulkhead shown in FIGS. 10 and 11 are adapted to engage with the bushings 81 of the root end 16 (see e.g. FIG. 3) rather than with root end pins 83, as shown for instance in FIG. 6 and FIGS. 8a-8h. In the present example, the bulkhead 70 has four bulkhead pins 71 for engaging with corresponding four bushings 81. Like embodiments that use flange tabs with holes, the number of pins 71 can be 1, 2, 3, 4 or more than 4.

FIG. 11 illustrates a cross-section of the bulkhead 70 shown in FIG. 10, showing the bulkhead pins 71 extending mutually parallelly and arranged so that they may engage with corresponding bushings 81 at the root end 16.

Embodiments that use bulkhead pins 71 might additionally employ clamping means for securing the bulkhead 70 to the root end while the bulkhead is being adhered to the root end. Unlike the bulkhead 50 that can be secured as shown in FIGS. 8g, 8h, and 9, the bulkhead pins 71, when just simple pins, do not engage securely with the bushings 81 of the root end 16. Separate clamping means must therefore be used. However, the pins 71 could be made in such a way that they could securely but releasably engage with the bushings 81.

A combination of the bulkhead 50 in FIG. 6 and the bulkhead 70 in FIG. 10 can be used. For instance, the bulkhead may have for instance two flange tabs 51 with holes 52 for engaging with pins 83 at the root end of the wind turbine blade, and have two bulkhead pins 71 for engaging with corresponding two bushings 81 in the root end of the wind turbine blade.

LIST OF REFERENCE NUMERALS

A-A cross-section of blade in airfoil region
L longitudinal axis of wind turbine blade
2 wind turbine
4 tower
6 nacelle
8 hub
10 wind turbine blade
11 first blade shell part (pressure side) in airfoil region
12 second blade shell part (suction side) in airfoil region
14 blade tip
16 root end
18 leading edge
20 trailing edge
24 first blade shell part (pressure side) at root end
26 second blade shell part (suction side) at root end
28 bond lines/glue joints
30 root region
32 transition region
34 airfoil region
40 shoulder
49 prior art bulkhead
45 prior art bulkhead base portion
46 prior art bulkhead peripheral
47 prior art bulkhead peripheral wall outer surface
49 prior art bulkhead
50 bulkhead
51 flange tabs
52 bulkhead flange tab hole
55 bulkhead base portion
56 peripheral wall of bulkhead
57 outer surface of peripheral wall of bulkhead
60 bulkhead
63 bulkhead flange
64 bulkhead flange hole
65 bulkhead base portion
66 peripheral wall of bulkhead
67 outer surface of peripheral wall of bulkhead
70 bulkhead
71 bulkhead pin
80 inner surface of peripheral wall at root end
81 bushing
82 outer surface of peripheral wall at root end
83 root end pin
83a bushing engagement part of root end pin
84 clamper
85 bushing threading
86 outer threading on pin outside bushing
100 vacuum lifter
101 arm joint
101a rotatable arm joint
102 movement device attachment arm
103 vacuum lifter arm
104 vacuum attachment means in non-vacuum state
105 vacuum attachment means in vacuum state

The invention claimed is:

1. A method for installing a bulkhead (50, 60, 70) at an installation position in a wind turbine blade having a root end (16) comprising fastening means (81) for fastening the wind turbine blade to a wind turbine hub, the method comprising:
providing the bulkhead (50, 60, 70) to be installed in the wind turbine blade, the bulkhead comprising attachment means (51, 52, 63, 64, 71) for attaching the bulkhead to the root end;
attaching holding means (104, 105) of a movement device (100) to the bulkhead, the attaching of the holding means allowing the movement device to hold and lift the bulkhead;
moving, using the movement device, the bulkhead into the installation position while the bulkhead is attached to the holding means, the moving comprising engaging the attachment means of the bulkhead with receiving means (81, 83) of the root end, the receiving means being arranged and adapted to receive and hold the bulkhead by engaging with the attachment means (51, 52, 63, 64, 71) of the bulkhead; and
adhering the bulkhead to the wind turbine blade, wherein a surface of the bulkhead is adhered to an inner surface of the wind turbine blade, and wherein said surface of the bulkhead and said inner surface of the wind turbine blade are each separate and distinct from the receiving means and the attachment means.

2. The method in accordance with claim 1, wherein the attachment means have been formed integrally in the bulkhead.

3. The method in accordance with claim 1, further comprising, after the step of adhering:
removing a part of or all of the attachment means (51, 52, 63, 64, 71) from the bulkhead.

4. The method in accordance with claim 1, further comprising, before the step of adhering:
releasing the holding means from the bulkhead.

5. The method in accordance with claim 1, further comprising, before moving the bulkhead into the installation position and while the bulkhead is attached to the holding means:
determining that the attachment means of the bulkhead is not aligned with the receiving means of the root end, and
aligning the attachment means with the receiving means by rotating the bulkhead using the movement device.

6. The method in accordance with claim 1, wherein either:
the attachment means comprises one or more holes (52, 64) and the receiving means comprises corresponding one or more pins (83), and/or
the attachment means comprises one or more pins (71) and the receiving means comprises corresponding one or more holes (81), and wherein the step of moving the bulkhead into the installation position comprises engaging the one or more pins (71, 83) with the one or more holes (52, 64, 81).

7. The method in accordance with claim 6, wherein the one or more holes and/or one or more pins are located in a flange (63) or in one or more flange tabs (51) extending radially outwards from a peripheral wall of the bulkhead.

8. The method in accordance with claim 1, wherein the fastening means of the root end comprises bushings (81), and wherein the attachment means of the bulkhead comprises one or more pins (71) adapted to temporarily engage with corresponding one or more of the bushings (81), and wherein the step of arranging the receiving means in the root end comprises engaging the one or more pins with corresponding one or more of the bushings.

9. The method in accordance with claim 1, further comprising clamping the bulkhead to the root end.

10. The method in accordance with claim 9, further comprising releasing, after or during the step of clamping and before the step of adhering, the holding means from the bulkhead.

11. The method in accordance with claim 9, wherein the holding means are vacuum attachment means (104, 105), and the step of attaching the holding means to the bulkhead comprises bringing the vacuum attachment means into contact with the bulkhead and activating a suction in the vacuum attachment means to releasably attach the bulkhead to the vacuum attachment means.

12. A bulkhead (50, 60, 70) for a wind turbine blade, the bulkhead comprising:
   a base portion (55, 65) for partitioning an inner cavity of a wind turbine blade;
   a peripheral wall (56, 66) extending from the base portion for adhering the bulkhead to an inner peripheral wall of a wind turbine blade; and
   a flange (63) or one or more flange tabs (51), the flange or one or more flange tabs extending radially outwards from the peripheral wall, the flange or one or more flange tabs comprising:
      one or more holes (52, 64) for engaging with corresponding one or one pins (83) in a root end of a wind turbine blade, and/or
      one or more pins (71) for engaging with corresponding one or more holes in a root end of a wind turbine blade.

13. The bulkhead in accordance with claim 12, wherein the base portion (55, 65), the peripheral wall (56, 66), and the flange (63) or one or more flange tabs (51) are formed integrally in the bulkhead.

14. The bulkhead in accordance with claim 12, wherein the base portion (55, 65), the peripheral wall (56, 66), and the flange (63) or one or more flange tabs (51) are formed integrally in the bulkhead and are made of one or more fibre-reinforced composites.

15. A method for installing a bulkhead (50, 60, 70) at an installation position in a wind turbine blade having a root end (16) comprising fastening means (81) for fastening the wind turbine blade to a wind turbine hub, the method comprising:
   providing the bulkhead (50, 60, 70) to be installed in the wind turbine blade, the bulkhead comprising attachment means (51, 52, 63, 64, 71) for attaching the bulkhead to the root end;
   attaching holding means (104, 105) of a movement device (100) to the bulkhead, the attaching of the holding means allowing the movement device to hold and lift the bulkhead;
   moving, using the movement device, the bulkhead into the installation position while the bulkhead is attached to the holding means, the moving comprising engaging the attachment means of the bulkhead with receiving means (81, 83) of the root end, the receiving means being arranged and adapted to receive and hold the bulkhead by engaging with the attachment means (51, 52, 63, 64, 71) of the bulkhead; and
   adhering the bulkhead to the wind turbine blade,
   wherein either:
      the attachment means comprises one or more holes (52, 64) and the receiving means comprises corresponding one or more pins (83), and/or
      the attachment means comprises one or more pins (71) and the receiving means comprises corresponding one or more holes (81),
   wherein the step of moving the bulkhead into the installation position comprises engaging the one or more pins (71, 83) with the one or more holes (52, 64, 81), and
   wherein the one or more holes and/or one or more pins are located in a flange (63) or in one or more flange tabs (51) extending radially outwards from a peripheral wall of the bulkhead.

* * * * *